Figure 1:
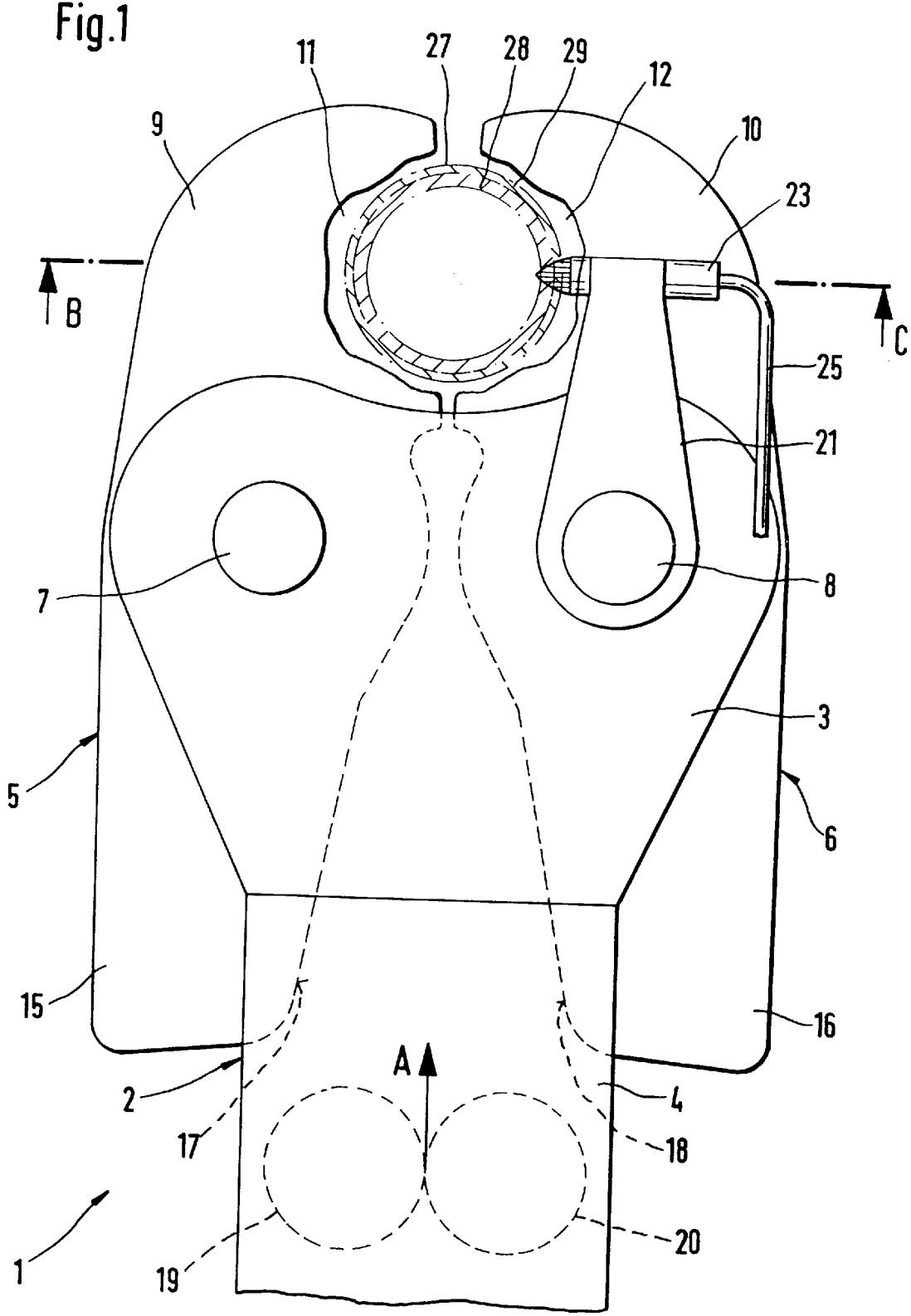

United States Patent

Lohmann

[19]

[11] Patent Number: 5,824,906
[45] Date of Patent: Oct. 20, 1998

[54] PRESSING TOOL

[75] Inventor: Gert Lohmann, Neuss, Germany

[73] Assignee: Novopress GmbH Pressen und Presswerkzeuge & Co. KG, Germany

[21] Appl. No.: 602,813

[22] PCT Filed: Aug. 17, 1994

[86] PCT No.: PCT/EP94/02734

§ 371 Date: Feb. 26, 1996

§ 102(e) Date: Feb. 26, 1996

[87] PCT Pub. No.: WO95/06232

PCT Pub. Date: Mar. 2, 1995

[30] Foreign Application Priority Data

Aug. 26, 1993 [DE] Germany .............................. 9312808 U

[51] Int. Cl.[6] ................................................. H01R 43/048
[52] U.S. Cl. ............................................ 73/597; 29/407.7
[58] Field of Search ............................... 73/597; 324/229; 29/469.5, 505, 506, 508, 407.01, 407.05, 407.07, 407.7; 81/9.3, 426.5; 72/31.01, 31.04, 31.1, 31.02, 31.11, 31.12, 31.06, 19.6

[56] References Cited

U.S. PATENT DOCUMENTS

| | | | |
|---|---|---|---|
| 3,345,840 | 10/1967 | Webb | 72/31.1 |
| 3,464,246 | 9/1969 | Abromavage et al. | 72/31.1 |
| 3,859,837 | 1/1975 | Burroughs | 29/508 |
| 4,520,672 | 6/1985 | Saint-Amour | 73/622 |
| 4,555,665 | 11/1985 | Stanley et al. | 324/229 |
| 5,484,174 | 1/1996 | Gotoh et al. | 29/508 |
| 5,490,406 | 2/1996 | College | 72/31.01 |

FOREIGN PATENT DOCUMENTS

| | | |
|---|---|---|
| 1187870 | 10/1965 | Germany . |
| 3327762 | 2/1984 | Germany . |
| 4012504 | 8/1991 | Germany . |
| 9216369.6 | 3/1993 | Germany . |
| 9216760 | 3/1993 | Germany . |

OTHER PUBLICATIONS

57–142507 Sep. 3, 1982 Japan Abstract Name: Kubota Tekko K.K. "Ascertaining Method for Position of Rubber Ring for Tube Coupling".

*Primary Examiner*—Robert Raevis
*Attorney, Agent, or Firm*—Joseph W. Berenato, III

[57] ABSTRACT

A measurement apparatus is disclosed for a pipe joint assembly (27, 63, 92, 103, 116) to detect the depth of penetration of a pipe end into a press fitting. The measurement apparatus is characterized in that it has an apparatus support (1, 42, 82, 102) that may be set on the outer side of the pipe joint assembly (27, 63, 92, 103, 116), a thickness sensor (23, 24, 74, 75, 90, 113) mounted thereon to detect the thickness of material in the pipe joint assembly (27, 63, 92, 103, 116), and an evaluation device to provide at least a qualitative indication of the detected thickness of material.

7 Claims, 3 Drawing Sheets

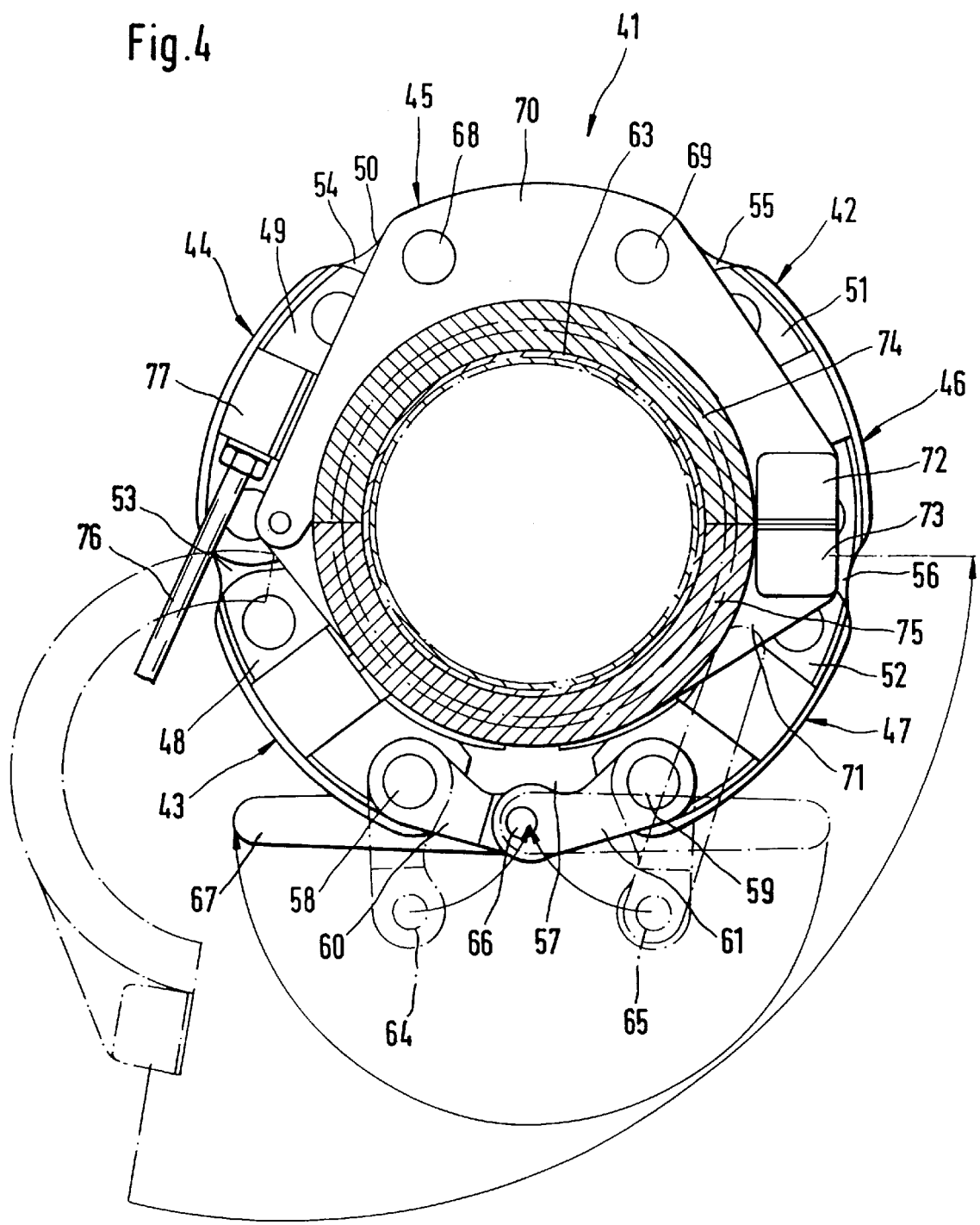

PRESSING TOOL

The invention relates to a pressing tool for radially compressing a pipe connection between the pipe end and a press fitting.

Sleeve-shaped press fittings are known to be used for pipe ends which are plastically deformable and are made of metal, preferably steel. Such pipe connections and the respective press fittings are described, for example, in DE-C-11 87 870 and DE-C-40 12 504. For the manufacture of the connection, the pipe end and the press fitting are pushed into each other axially and, thereafter, they are force- and form-tightly connected via a pressing tool which is mounted on the press fitting by pressing jaws which are movable toward each other.

The reliability of the connection between the pipe end and the press fitting depends, among other things, on the fact that the pipe end is pushed into the press fitting at a determined minimum insertion depth. The insertion depth is delimited by a constriction in the press fitting. Thereby, the axial distance from the constriction to the end into which the pipe end is to be pushed is greater, the greater the circumference of the pipe end or the press fitting is. The constriction forms, at the same time, a stop to prevent the further insertion of the pipe end.

The arrival at the minimum insertion depth depends of the reliability and the feeling of the mounter. Especially under limited space conditions, the insertion of the pipe end into the press fitting can be impaired and, therefore, it can come to jamming before the constriction is reached, which has the consequence that the minimum depth is not reached and the mounter erroneously does not notice it. As an additional control, it has been suggested to provide markings for the minimum insertion depth on the outside of the pipe. Special measuring apparatus have been developed for this purpose (DE-GM 92 16 760.8). Even the use of marking apparatus does not provide an absolute security against incorrect manipulation. Furthermore, the markings can be inadvertently wiped off.

In DE-C-40 12 504, a process is proposed, which allows a compression only then, when an axial force is applied with the help of a device arranged on a pressing tool, whereby the compression is only then decoupled, when the axial force exceeds a determined threshold value. In this process, it is assumed that the threshold value is only exceeded when the pipe end collides with the constriction. Besides the fact that a correspondingly built arrangement for seizing the axial forces must be provided for this process, the process also does not sufficiently ensure that the threshold value for the axial force is only reached when the pipe end actually collides against the constriction.

A process is known from JP-A-57-142507, wherein the position of a rubber ring, which is arranged on the inside of a pipeline faucet and inverted over a pipe end, can be determined. For this purpose, an oscillation source is moved along a pipe axis inside the pipe. An oscillation sensor is placed in the front area of the pipe and measures the change in the oscillation behavior in dependence upon the movement of the oscillation source. The position of the rubber ring between pipeline faucet and pipe end can be determined based on these changes.

This process is not for determining the insertion depth of the pipe end and, additionally, presupposes that the measuring apparatus with the oscillation source and the oscillation sensor can be guided in from the inside. The process, therefore, is not useful for the measurement of the insertion depth in a pipe connection of the present art.

Therefore, the invention has as its object to provide a means for a secure control of the insertion depth between a pipe end and a press fitting in a pipe connection.

The object of the invention is solved in that the measuring apparatus for measuring the insertion depth of the pipe end is provided in the press fitting, which has a thickness sensor for the measurement of the material strength of the pipe connection as well as an interpretation device for the at least qualitative display of the measured material strength on the pressing tool. For this purpose, ultrasound sensors, magnetic field sensors and/or eddy current sensors can be especially taken into consideration for the thickness sensor. Also, thickness sensors based on other physical effects can be considered, which are able to measure the material thickness of the pipe connection.

The basic idea of the invention relies also on the further measurement of the insertion depth with the help of a measuring apparatus which is capable of measuring the material thickness of the pipe connection. For this purpose, it is enough that this measuring apparatus can provide the qualitative difference between the material thickness of the press fittings alone and the material thickness which is formed by the combination of the material thickness of the press fittings and of the pipe end. The difference is prepared by an interpretation device in such a manner that the person performing the work receives the corresponding optical or acoustic information. It can be created as a warning information in the case when the measuring apparatus measures only the material thickness of the press fittings. However, a quantitative indication for the corresponding measured material thickness is also pertinent.

As a rule, a pressing tool equipped in this manner is useful only for the compression of pipe connections of a very determined diameter so that an arrangement of the thickness sensor is then sufficient which comes to lie over the insertion depth provided. Since the pressing tool, or parts thereof, is to be used for the compression of pipe connections of different diameters, it is recommended to provide at least one radial displacement device—preferably in combination with an axial displacement device—to adapt the thickness sensor with respect to its axial and radial position on the respective diameter of the pipe connection in such a manner that the control of the pipe end is possible after reaching the respective preset insertion depth.

The invention is further explained in the drawings with the help of embodiments.

Figure 2:
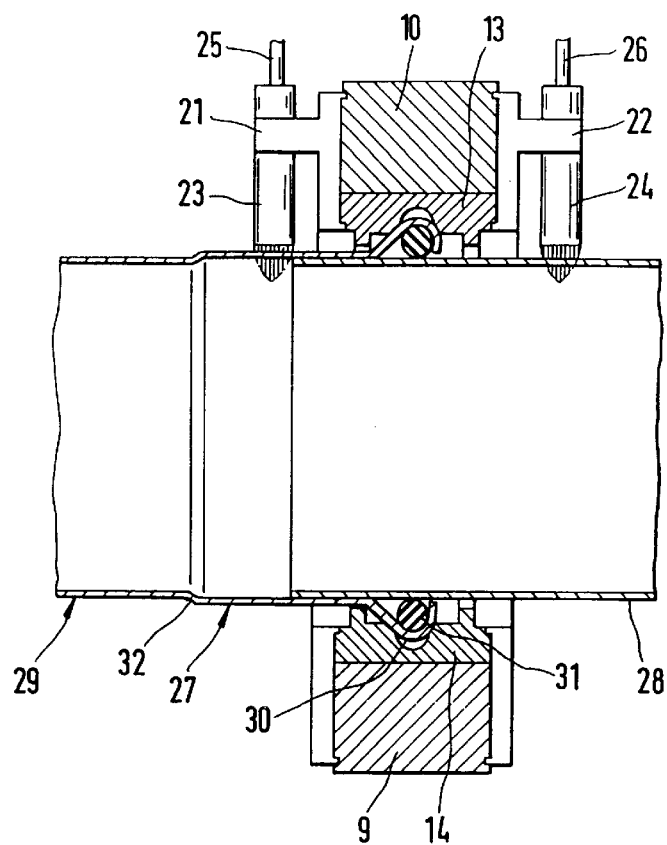

FIG. (1) shows a pressing tool with thickness sensor in frontal view;

FIG. (2) shows an axial section through a pipe connection with the pressing tool according to FIG. 1 in the plane B–C;

FIG. (3) shows the axial section according to FIG. 2 with the pipe end inserted;

FIG. (4) shows a front view of a pressing tool with thickness sensor.

The pressing tool (1) of FIG. 1 shows a ground plate (2), which is comprised by an approximately heart-shaped end piece (3) and a holding plate (4) continued downwardly. Pressing levers (5, 6) are pivotally connected to the end piece (3) over joint bolts (7, 8).

Figure 3:
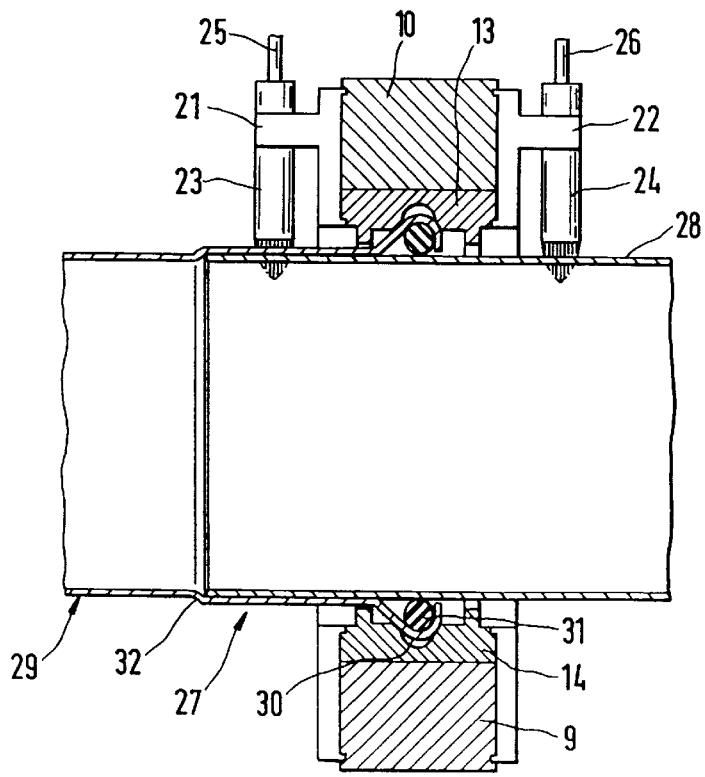

The corresponding upper lever arms (9, 10) of the pressing lever (5, 6) have opposite lying grooves (11, 12). As can be seen in FIGS. 2 and 3 especially, the grooves (11, 12) are delimited by the pressing jaws (13, 14), which are located in the lever arms (9, 10) and held thereon.

The pressing levers (5, 6) have lower lever arms (15, 16), which have forking surfaces (17, 18) on their mutually opposite sides and which have a distance which diminishes conically in the direction of the joint bolts (7, 8). On the holding plate (4), two forking surfaces (19, 20) are positioned one beside the other on a slide (not shown here). The slide can be moved in the direction of the arrow (A) by means of a mountable drive device. In this way, the forking rolls (19, 20) run against the forking surfaces (17, 18) and push the lower lever arms (15, 16) apart. This, further, has the result that the upper lever arms (9, 10) are moved toward each other.

On the end piece (3), and particularly on the right joint bolt (8), holders (21, 22) are provided on each side, which hold on each free end a respective horizontally extending ultrasound sensor (23, 24) of a known construction. Electrocables (25, 26) protrude out of the rear end of the ultrasound sensors (23, 24) and lead to a measuring apparatus (not shown here). Here also, the measuring apparatus is of a known type which is commonly available in the marketplace.

As can be seen especially in FIGS. 2 and 3, the pressing jaws (13, 14) encompass a pipe connection (27). The pipe connection consists of a pipe end (28) and a press fitting (29) known from the art. The press fitting (29) is only represented partially and has, on the end facing the pipe end, a ring-shaped bulge (30) on the inner side of which a sealing ring (31) is placed which is made of elastomeric material. At a distance from the ring-shaped bulge (30), the press fitting (29) has a constriction (32) which forms a stop for the pipe end (28).

In FIG. 2, the pipe end (28) is not inserted up to the constriction (32), but stops before the ultrasound sensor (23). The same measures thereby only the material thickness, that is, the wall thickness of the press fittings (29). This is shown correspondingly on the interpretation device, for example, by a digital display or through a warning indication of an acoustic or optic kind. Thereby, the interpretation device with the drive device for the pressing tool (1) can be coupled in such a manner that the drive device cannot be operated as long as the ultrasound sensor only measures the wall thickness of the press fittings (29). In this way, a faulty manipulation of the pressing tool (1) is automatically avoided.

In FIG. 3, the pipe end (28) is inserted into the insertion depth provided up to the constriction (32). The ultrasound sensor (23) measures now not only the wall thicknesses of both the press fittings (29) and the pipe end (28) but also the double material thickness. The interpretation device shows this correspondingly and sets the drive device for the pressing tool free, insofar a direct connection exists between both.

The pressing effect per se can only begin by operation of the drive device. As described above, the forking rolls (19, 20) run between the lower lever arms (15, 16) and so pivot the upper lever arms (9, 10) against each other, whereby the press fitting (29) and the pipe end (28) are radially compressed. In this way, the ring-shaped bulge (30) is pushed against the pipe end (28) so that the sealing ring (31) is pressed on the pipe end (28) with the radial strength needed for a good seal.

As can be seen in FIGS. 2 and 3, the pressing jaws (13, 14) are shaped symmetrical. This means that the pressing tool (1) can be placed and operated on opposite sides. So as to be able to exert a control of the insertion depth of the pipe end (28) in this case also, the second ultrasound sensor (24) is attached on the other side of the pressing tool (28). The ultrasound sensor (24) is not necessary when the pressing jaws (13, 14) have an asymmetric shape, which allows a positioning of the pressing tool only in one position, or when other arrangements prevent the positioning in an erroneous position as described in DE-GM 92 16 369.6.

In FIG. 4, a pressing tool (41) is provided, as seen in individual examples in DE-GM 92 16 369.6. The pressing tool (41) has a pressing ring (42) with five practically identically shaped pressing jaw elements (43, 44, 45, 46, 47). Therefore, each pressing jaw element is comprised of outer pressing jaw carriers (48, 49, 50, 51, 52) and an inner arc-shaped pressing jaw. All except of the pressing jaw carriers (48, 49, 50, 51, 52) are joint-connected over the intermediate pieces (53, 54, 55, 56).

The lower pressing jaw elements (43, 47) in this view have a closing slit (57) between them. The free ends of these pressing jaw elements (43, 47) carry joint bolts (58, 59) on each of which a coupling latch (60, 61) is hung. When the coupling latches (60, 61) are placed in the position indicated by a line-and-dot line, so that they are not coupled together, the pressing ring (42) can by positioned over a pipe connection (63) which consists of a press fitting and a pipe end. This is shown in the drawing. Then, both lower pressing jaw elements (43, 47) are pivoted toward each other until the coupling holes (64, 65) provided on their free ends are aligned with each other. The coupling bolt (66), which is connected to an operating lever (67), is pushed through these coupling holes (64, 65). By moving the operating lever (67) by 180°, the connection between the two coupling latches (60, 61) can be shortened somewhat and the pressing ring (42) is thereby tightened in such a manner that it sits firmly on the pipe connection (63). For this purpose, the coupling bolt (66) is shaped as an eccentric bolt as can be seen from DE-GM 92 16 369.6. Reference is made to this because it is not necessary for the function of the present invention.

A U-latch is fastened to the joint bolts (68, 69) of the upper pressing jaw elements (45). A U-handle is attached to the left end in the axial middle plane of the pressing tool (41). The U-handle (71) is pivoted from the position represented as a line-and-dot line to the position represented as a solid line and is connected over the coupling elements (72, 73) to the U-latch (70). The inner edge of the U-latch (70) and the U-handle (71) forms a closed circle concentric with the pipe connection (63).

Semicircular induction spools (74, 75) are placed in the U-latch (70), on the one hand, and on the U-handle (71), on the other hand, and form a closed cylinder-shaped induction spool in the closed position shown. The induction spools (74, 75) can be provided with alternate current via a cable (76) and an entrance position (77). This has the consequence that an eddy current is originated, with an inductivity which depends on the material thickness of the pipe connection (63) in the region of the induction spools (74, 75).

The induction spools (74, 75) have an axial distance to the pressing ring (42) such that the pressing ring (42) is correctly set in place around the ring-shaped bulge (not shown here) or the press fittings are placed in a certain position which is comparable with the position of the ultrasound sensor (23) in the exemplary embodiment according to FIGS. 1 to 3, that is, in the immediate vicinity of the constriction of the press fitting. In this way, the inductivity, when only a press fitting is present in this region because the corresponding pipe end is not inserted sufficiently deep into the press fitting, is different from the inductivity which is present when the pipe end is completely inserted. This can be measured with methods not represented herein and can be transmitted to the interpretation device (also not shown) for displaying the two situations.

I claim:

1. Pressing tool (1, 41) for radially compressing a pipe connection (27, 63) between a pipe end (28) and a press fitting (29), characterized in that an apparatus is provided for attachment to the pressing tool, said apparatus for ascertaining the insertion depth of the pipe end (28) into the press fitting (29), said apparatus includes a thickness sensor (23, 24, 74, 75) for measuring the material thickness of the pipe connection (27, 63) and an interpretation device for at least the qualitative display of the measured material thickness.

2. Pressing tool according to claim 1, characterized in that the thickness sensor (23, 24) is an ultrasound sensor.

3. Pressing tool for forming through radial compression a pipe connection between a pipe end and a press fitting, comprising:
   a) a tool for radially compressing a press fitting about a pipe end after the pipe end has been positioned a predetermined distance within the pipe fitting; and
   b) an apparatus attachable to the tool for determining whether the pipe end has been inserted the predetermined distance within the pipe fitting, said apparatus comprising a thickness sensor for measuring the thickness of the pipe end and pipe fitting material at a predetermined location along the pipe fitting and an interpretation device for displaying the measured material thickness.

4. The tool of claim 3, wherein:
   a) said thickness sensor is an ultrasound sensor.

5. The tool of claim 4, wherein:
   a) said interpretation device is chosen from the group consisting of digital displays, acoustic indicators, and optical indicators.

6. The tool of claim 3, wherein:
   a) said interpretation device is chosen from the group consisting of digital displays, acoustic indicators, and optical indicators.

7. The tool of claim 3, wherein:
   a) there are at least two thickness sensors, and said tool is disposed between said sensors.

* * * * *